(12) United States Patent
Streltsova et al.

(10) Patent No.: US 7,534,407 B2
(45) Date of Patent: May 19, 2009

(54) RECOVERY OF NICKEL

(75) Inventors: Natalia Streltsova, Perth (AU); Domenic Furfaro, Perth (AU)

(73) Assignee: WMC Resources Limited (AU)

( * ) Notice: Subject to any disclaimer, the term of this patent is extended or adjusted under 35 U.S.C. 154(b) by 0 days.

(21) Appl. No.: 11/602,556

(22) Filed: Nov. 21, 2006

(65) Prior Publication Data
US 2007/0131059 A1 Jun. 14, 2007

(30) Foreign Application Priority Data
May 21, 2004 (AU) ............... 2004902740
May 20, 2005 (WO) ............... PCT/AU2005/000724

(51) Int. Cl.
*B01D 11/00* (2006.01)
*B01D 49/00* (2006.01)
*C21B 15/00* (2006.01)

(52) U.S. Cl. ............ 423/150.1; 75/743; 423/140; 423/150.3; 423/150.4

(58) Field of Classification Search ......... 423/150.1, 423/138, 150.3, 150.4, 140; 74/743; 205/370; 75/743
See application file for complete search history.

(56) References Cited

U.S. PATENT DOCUMENTS

| | | | |
|---|---|---|---|
| 4,039,406 A | 8/1977 | Stanley et al. | |
| 4,888,053 A * | 12/1989 | Grayson et al. | 423/38 |
| 5,120,353 A * | 6/1992 | Fugleberg et al. | 75/419 |
| 5,431,788 A | 7/1995 | Jones | |
| 5,468,281 A * | 11/1995 | Kerfoot | 75/710 |
| 5,595,642 A * | 1/1997 | Xue et al. | 205/591 |
| 5,645,708 A | 7/1997 | Jones | |
| 5,650,057 A | 7/1997 | Jones | |
| 5,855,858 A * | 1/1999 | Jones | 423/150.1 |
| 5,869,012 A | 2/1999 | Jones | |
| 5,874,055 A | 2/1999 | Jones | |
| 5,902,474 A | 5/1999 | Jones | |
| 6,054,105 A | 4/2000 | Jones | |
| 6,206,951 B1 * | 3/2001 | Fugleberg | 75/743 |
| 6,383,460 B2 | 5/2002 | Jones | |
| 6,428,604 B1 * | 8/2002 | Kerfoot et al. | 75/743 |
| 6,569,224 B2 | 5/2003 | Kerfoot et al. | |
| 2002/0012621 A1 | 1/2002 | Jones | |
| 2003/0033906 A1 | 2/2003 | Kerfoot et al. | |
| 2004/0045405 A1 * | 3/2004 | King | 75/421 |

FOREIGN PATENT DOCUMENTS

WO WO 02/24966 A1 3/2002

* cited by examiner

*Primary Examiner*—Karl E Group
*Assistant Examiner*—Noah S Wiese
(74) *Attorney, Agent, or Firm*—Brinks Hofer Gilson & Lione; G. Peter Nichols

(57) ABSTRACT

A process for recovering nickel from a solid feed material containing nickel in the form of millerite is disclosed. The process includes treating a slurry of the solid feed material and a process solution so that all or at least part of the nickel in the millerite forms an acid leachable solid form. The process also includes pressure acid leaching the treated slurry and leaching nickel in solids in the slurry into solution. Finally, the process includes recovering nickel from solution.

29 Claims, No Drawings

RECOVERY OF NICKEL

This application claims priority to PCT application PCT/AU2005/000724 published as WO 2005/113845 published in English on Dec. 1, 2005 and to Australian application 2004902740 filed May 21, 2004, the entire contents of each are incorporated herein by reference.

BACKGROUND OF THE INVENTION

The present invention relates to a process for recovering nickel from an ore or concentrate via a hydrometallurgical route.

SUMMARY OF INVENTION

The present invention relates to a process for recovering nickel from a solid feed material containing nickel in the form of millerite which includes the steps of treating a slurry of the solid feed material and a process solution so that all or at least part of the nickel in the millerite forms an acid leachable solid form; pressure acid leaching the treated slurry from step (a) and leaching nickel in solids in the slurry into solution; and recovering nickel from solution.

DESCRIPTION

The present invention relates particularly to recovering nickel from an ore or concentrate that contains nickel in the form of millerite (NiS).

The present invention relates particularly to recovering nickel from an ore or concentrate that contains nickel in the form of millerite (NiS).

The present invention relates more particularly, although by no means exclusively, to recovering nickel and cobalt from an ore or concentrate that contains nickel in the form of millerite (NiS).

The ore or concentrate may include other sulphide minerals in addition to millerite. There may be nickel in one or more than one of the other sulphide minerals.

The ore or concentrate may include oxide minerals. There may be nickel in one or more than one of the oxide minerals.

The ore or concentrate may include other sulphide minerals in addition to millerite and oxide minerals. There may be nickel in one or more than one of the other sulphide minerals and the oxide minerals.

In addition to nickel and cobalt, the ore or concentrate may include other valuable metals, such as copper.

The concentrate may be derived from a specific ore body that contains millerite and other sulphide minerals and/or oxide minerals. Alternatively, the concentrate may be derived from a blend of a number of different ore bodies and contain different minerals, including millerite.

Materials of interest to the applicant contain millerite, heazlewoodite ($Ni_3S_2$), godlevskite ($Ni_8FeS_8$), pentlandite (($Ni,Fe)_9S_8$) and violarite ($Ni_2FeS_4$).

The present invention was made during the course of a research program that was carried out by the applicant to investigate unexpectedly poor leachability of slurries of ores and concentrates containing blends of the minerals millerite, pentlandite, and in some instances other minerals such as violarite under acidic conditions.

The poor leachability was obtained using a hydrometallurgical process that included pressure oxidation acid leaching under conditions that the applicant expected would achieve reasonable recoveries of nickel from the ores and concentrates.

The research program found that the chloride concentration in process solutions used in the hydrometallurgical process had a significant impact on the leachability of nickel from millerite under acidic conditions. Specifically, the research program found that the leachability of nickel from millerite in pressure oxidation under acidic conditions decreased as the chloride concentration in process solutions increased above a specific threshold.

The present invention is based on the realization that, in situations in which a leach under acid conditions is required and the available process solutions for a hydrometallurgical process have chloride concentrations that are sufficient to impact adversely on leachability of nickel from millerite under acid conditions, the process should include a treatment step in which millerite is converted at least in part to an acid leachable form prior to a subsequent pressure oxidation acid leach step.

In any given situation, the minimum concentration of chloride that impacts adversely on leachability of nickel from millerite under acid conditions will depend on a range of factors.

The applicant has found that such a hydrometallurgical process that includes the millerite treatment step and the subsequent pressure acid leach step (preferably under oxidation conditions) achieves high nickel recoveries in situations in which the process solutions contains chloride concentrations that are sufficient to impact adversely on leachability of nickel from millerite under acid conditions.

The applicant has also found that such a hydrometallurgical process achieves higher recoveries of cobalt from the ores and concentrates than is achieved with a standard pressure acid leach step without a preceding millerite treatment step.

According to the present invention there is provided a process for recovering nickel from a solid feed material containing nickel in the form of millerite which includes the steps of: (a) treating a slurry of the solid feed material and a process solution so that all or at least part of the nickel in the millerite forms an acid leachable solid form; (b) pressure acid leaching the treated slurry from step (a) and leaching nickel in solids in the slurry into solution; and (c) recovering nickel from solution.

Typically, the feed material includes an ore or a concentrate.

In addition to millerite, the feed material may contain other nickel-containing minerals. As indicated above, the minerals may be sulphide and/or oxide minerals.

The feed material may also contain other valuable metals such as cobalt and/or copper.

The experimental program on which the present invention is based was carried out on ores and concentrates containing blends of millerite and pentlandite and in some instances other sulphide minerals.

The process is not dependent on the nickel grade and is applicable to feed materials of any nickel grade subject to economic viability.

The current view of the applicant is that the process is a viable option economically in situations in which at least 10% by weight of the nickel in the ore or concentrate for the process is in the form of millerite.

Typically, the feed material may range between low-grade nickel ores and concentrates, such as ores and concentrates having 2-3 wt % nickel and high grade concentrates, such as concentrates containing more than 20 wt % nickel.

Preferably, the feed material is in a particulate form having a grain size in the range of 10-40 microns. In any given situation, the preferred grain size is a function of the mineralogy of the feed material.

Preferably, the process solution contains at least 5 g/l chlorides. More preferably, the process solution contains at least 20 g/l chlorides. It is preferred particularly that the process solution contains at least 30 g/l chlorides.

Preferably, step (a) includes treating the slurry of the feed material and the process solution under non-acidic conditions.

The term "non-acidic" conditions is understood herein to mean that the pH of the slurry is above a pH of 5.5. Preferably, step (a) includes treating the slurry of the feed material and the process solution at a pH in the range of 5.5-7. In this context, it is noted that the slurry may be at a different pH, for example a higher pH, prior to step (a).

Preferably, step (a) includes adjusting the pH of the slurry to be within the range of 5.5-7 and maintaining the pH within the range during step (a) by the presence of acid soluble alkaline gangue minerals in the feed material or by adding an alkaline agent to the slurry. Preferably, step (a) includes treating the slurry of the feed material and the process solution at an elevated temperature.

Typically, the elevated temperature is in a range of 80-160° C. More preferably, the elevated temperature is at least 110° C. More preferably, the elevated temperature is at least 130° C. More preferably, the elevated temperature is no more than 155° C. More preferably, the elevated temperature is no more than 150° C.

Step (a) may be carried out under atmospheric or pressure conditions. Preferably, step (a) includes treating the slurry of the feed material and the process solution under oxidation conditions. More preferably, step (a) includes treating the slurry under pressure oxidation conditions. Preferably, step (a) includes treating the slurry of the feed material and the process solution under pressure oxidation conditions with an $O_2$ partial pressure that is sufficient to oxidize at least substantially all of the sulphide in the millerite to sulphate.

One issue that should be considered in relation to step (a) is that the conditions of the step should be selected to minimize oxidation of minerals other than millerite that can cause undesirable acid generation.

Preferably, step (a) also includes treating the slurry of the feed material and the process solution under pressure oxidation conditions with an $O_2$ partial pressure that is sufficient to oxidize other sulphide minerals in the feed material that can be oxidized without causing undesirable acid generation. By way of example, such other sulphide minerals may include heazlewoodite and godlevskite.

Typically, step (a) includes treating the slurry of the feed material and the process solution under pressure oxidation conditions with an $O_2$ partial pressure in a range of 250-1000 kPa(g). More preferably, the $O_2$ partial pressure is in a range of 500-1000 kpa(g) in step (a).

Preferably, the duration of step (a) is in a range of 15-90 minutes.

The applicant believes that the above-described treatment step (a) oxidizes sulphur in the millerite, with the result that nickel in the millerite is taken into solution with part of the nickel remaining in solution and the remainder of the nickel precipitating as a nickel hydroxide and/or basic nickel sulphate that is acid leachable.

Accordingly, the applicant believes that after a suitable treatment time, the slurry includes (a) soluble nickel in the process solution, (b) precipitated nickel hydroxide and/or basic nickel sulphate from the millerite, and (c) un-reacted, or partially reacted nickel-containing minerals of the type pentlandite, violarite etc.

Preferably, step (b) includes acid leaching the treated slurry from step (a) at a pH of 3 or less. More preferably, step (b) includes pressure acid leaching the treated slurry from step (a) at a pH of 2 or less. Preferably, step (b) includes pressure acid leaching the treated slurry from step (a) in sulphuric acid. Preferably, step (b) includes pressure acid leaching the treated slurry from step (a) under oxidation conditions. Preferably, step (b) includes pressure acid leaching the treated slurry from step (a) under pressure oxidation conditions with an $O_2$ partial pressure in a range of 800-1200 kPa(g).

Preferably, step (b) includes pressure acid leaching the treated slurry from step (a) at an elevated temperature. Typically, the elevated temperature is in a range of 100-160° C. Preferably, the elevated temperature is at least 130° C. Preferably, the elevated temperature is no more than 155° C. Preferably, the elevated temperature is no more than 150° C.

Preferably, the duration of step (b) is in a range of 30-120 minutes.

The process may include adding a separate slurry of a solid feed material and a process solution to the treated slurry from step (a) prior to or as part of step (b). Thus, the process extends to situations where there are different feed materials, some of which require treatment in steps (a) and (b) (for example, feed materials containing millerite) and others of which require treatment in step (b) only (for example, feed materials that are predominantly pentlandite). Steps (a) and (b) may be carried out in the same or different vessels.

In accordance with one embodiment of the above-described two step process of the present invention, a slurry is formed from (a) a concentrate of blended millerite and pentlandite assaying at between 5.5 and 40 wt % nickel (violarite, heazlewoodite, godlevskite and other sulphide minerals may together or separately be part of the blend); and (b) a process solution having a concentration of chloride in a range of 25-35 g/l. The slurry is thickened to approximately 30% w/w solids in a thickener. Thereafter, the thickened slurry is supplied to an autoclave.

The slurry is treated in the autoclave at a temperature of 150° C. and 800-1000 kPa(g) $O_2$ partial pressure for 30-60 minutes. The slurry pH is maintained in a range of 5.5-7. Under these conditions the millerite, (and heazlewoodite, and godlevskite, if present) fraction of the concentrate is oxidized with the nickel being taken into solution, a part of the nickel, typically 10-15 wt % remaining in solution, and the remainder of the nickel precipitating as an acid soluble form, typically hydroxides or basic nickel sulphates, as a consequence of hydrolysis ensuing from the presence of gangue with an alkaline potential in the concentrate.

Once millerite oxidation is complete, sulfuric acid is introduced into the autoclave and reduces the slurry pH to below 2. The slurry is acid leached at 150° C. in the presence of oxygen for 30-120 minutes. Under these acidic conditions pentlandite, violarite and other sulphide minerals and the precipitated nickel from millerite oxidation are leached and nickel is taken into solution. At the end of the acid leaching step, the process solution and the remaining solids are separated, and the process solution is processed to recover nickel from solution.

Specifically, the process solution is transferred to another autoclave and is sparged with $H_2S$ gas, which causes precipitation of NiS from the process solution. The process solution containing precipitated NiS is filtered or transferred to a thickener to separate solids and liquid streams. The solids stream is washed, or filtered and thereafter washed to form a final NiS product.

Alternatively, nickel can be recovered from the process solution as nickel hydroxide, nickel carbonate, basic nickel sulphate, or nickel metal.

As is indicated above, the present invention was made during the course of a research program. A selection of the results of an initial stage of the research program is presented in Tables 1 and 2 at the end of the specification.

Table 1 presents nickel and cobalt recoveries for 4 sets of paired results of pressure oxidation tests completed under acidic conditions at a temperature of 150° C. and an oxygen pressure of 1000 kpa(g) on millerite/pentlandite blends.

In the case of the first pair, Tests 1 and 2, slurries containing millerite/pentlandite blends containing 30-35 wt % of the nickel as millerite were leached in sulphuric acid. In the case of Test 1, the slurry contained a relatively high chloride concentration of 28 g/l, and in the case of Test 2, the slurry contained a relatively low chloride concentration of less than 0.3 g/l.

Test 1 reported a relatively low nickel recovery of 81.8% and Test 2 reported a relatively high nickel recovery of 94.5%. Similarly, Test 1 reported a relatively low cobalt recovery of 86.2% and Test 2 reported a relatively high cobalt recovery of 94.6%. These results indicate that high chloride concentration in the slurry had a significant adverse impact on nickel and cobalt recovery.

The other 3 sets of paired results in Table 1 confirm the above-described adverse impact of chloride concentration on nickel and cobalt recoveries for different feed concentrates, as set out in the Table.

Table 2 summarizes the results of a series of tests on the two-step process of the present invention carried out under different operating conditions. Specifically, the tests were carried out on slurries containing two different blends of millerite/pentlandite, with one blend containing 30-35 wt. % of the nickel as millerite (S:Ni ratio of 0.86) and the other blend containing a 75-80 wt. % of the nickel as millerite (S:Ni ratio of 0.6).

The tests were carried out under a series of operating conditions summarized in the Table, including: (a) autoclave temperatures of 110° C., 130° C., and 150° C., (b) $O_2$ partial pressures of 250 kPa(g), 500 kPa(g), and 1000 kPa(g), (c) slurry concentrations containing 15 wt. % solids, 16.7 wt. % solids, and 25 wt. % solids, (d) non-acidic treatment leach times of 10, 15, 30, 45, and 60 minutes, (e) acid leach times of 60, 90, and up to 120 minutes, and (f) a range of sulphuric acid concentrations. It is evident from Table 2 that the two-step process of the present invention achieved high nickel recoveries despite high concentrations of chloride in the process solutions.

The research program also included pilot plant work at a later stage in the program. Tables 3 and 4 summarize two pilot plant runs.

The pilot plant run summarized in Table 3 included leaching a sulphide concentrate containing a mixture of pentlandite, millerite and violarite together with other minor sulphide minerals that was ground to 80% passing 10-15 microns in a process water containing about 28 g/L chloride. The concentrate slurry (pH 8.2) was fed to a two-stage pressure oxidation process. In Step (a) the slurry was leached under "non-acidic" conditions at a temperature of 143° C. (Feed 1) and a total pressure of 179 psig. During the 80 minutes of leaching, the pH of the slurry reduced from 7.4 to 6.4 and the Eh increased from 300 mV to 380 mV. pH changes indicated that some acid was generated in the process but was consumed by the alkaline gangue minerals. After Step (a), all of the millerite and some pentlandite and violarite were oxidized but the concentration of nickel and cobalt in solution was low due hydrolysis taking place at high pH. In Step (b), the temperature was increased to 150° C., the total pressure was 210 psi, the slurry was acidified with sulphuric acid to pH below 2 and leached for further 120 minutes under acidic oxidative conditions. All of the nickel that oxidized and re-precipitated in Step (a) was extracted into solution. After 120 minutes most of the remaining nickel sulphide minerals dissolved resulting in an overall nickel extraction of 95.5% and cobalt extraction of 90.1%.

The pilot plant run summarized in Table 4 was carried out on another concentrate, with higher millerite content, using substantially the same process conditions as for the previous run. It can be seen from Table 4 that the process achieved an overall nickel extraction of 96.3% and cobalt extraction of 94.1%.

Many modifications may be made to the present invention described above without departing from the spirit and scope of the invention.

TABLE 1

Summary of Acidic Pressure Oxidation Tests - High and Low Chloride Concentrations

| Test | Description | Sample S:Ni | Head Grade Ni % | % Ni In Millerite | Water TDS | Acid Dose Kg/t | Recovery at 90 Minutes Ni | Co | S | $O_2$ Press: kPA(g) | Temp. ° C. |
|---|---|---|---|---|---|---|---|---|---|---|---|
| 1 | Pressure oxidation acid leach (High Chloride) | 0.86 | 22.5 | 30-35 | 28 g/L Cl⁻ | 90 | 81.8 | 86.2 | 86.4 | 1000 | 150 |
| 2 | Pressure oxidation acid leach (Low Chloride) | 0.86 | 22.5 | 30-35 | 0.27 g/L Cl⁻ | 85 | 94.5 | 94.6 | 95.1 | 1000 | 150 |
| 3 | Pressure oxidation acid leach (High Chloride) | 0.6 | 39.6 | 75-80 | 28 g/L Cl— | 90 | 77.4 | 79.8 | 77.2 | 1000 | 150 |
| 4 | Pressure oxidation acid leach (Low Chloride) | 0.6 | 39.6 | 75-80 | <0.1 g/L Cl— | 91 | 86 | 87.1 | 84.7 | 1000 | 150 |
| 5 | Pressure oxidation acid leach (High Chloride) | 0.6 | 6.9 | 75-80 | 28 g/L Cl— | 300 | 67 | 68.8 | 69.6 | 1000 | 150 |
| 6 | Pressure oxidation acid leach (Low Chloride) | 0.6 | 6.9 | 75-80 | <0.1 g/L Cl— | 300 | 86 | 81.9 | 87.7 | 1000 | 150 |
| 7 | Pressure oxidation acid leach (High Chloride) | 1.1 | 6.0 | 25-30 | 31 g/L Cl— | 300 | 85.7 | 82.2 | 63.3 | 1000 | 150 |
| 8 | Pressure oxidation acid leach (Low Chloride) | 1.1 | 6.0 | 25-30 | 0.4 g/L Cl— | 300 | 92.3 | 88.2 | 92 | 1000 | 150 |

TABLE 2

Two-Stage Leach Tests - Optimization of Leach Conditions

| Feed % Ni as Millerite | Temperature In Step (a) | O₂ Pressure kPa(g) In Step (a) | % Solids w/w | Cl— g/L | Leach Time, mins Step (a) | Leach Time, mins Step (b) | Acid Dose kg/t | Overall Recovery % Ni | Overall Recovery % Co |
|---|---|---|---|---|---|---|---|---|---|
| 30-35 | 150 | 1000 | 15 | 28 | 30 | 90 | 351 | 94.8 | 82.7 |
| 30-35 | 150 | 500 | 15 | 28 | 30 | 90 | 356 | 94.6 | 82.1 |
| 30-35 | 150 | 250 | 15 | 28 | 30 | 90 | 357 | 92.8 | 82.7 |
| 30-35 | 110 | 1000 | 15 | 28 | 60 | 90 | 340 | 92.5 | 74.4 |
| 30-35 | 150 | 1000 | 15 | 28 | 45 | 90 | 342 | 95.3 | 86.2 |
| 30-35 | 150 | 500 | 15 | 28 | 30 | 120 | 247 | 94.2 | 83.8 |
| 30-35 | 150 | 500 | 25 | 28 | 30 | 120 | 259 | 93.9 | 84.3 |
| 30-35 | 130 | 500 | 25 | 28 | 45 | 120 | 254 | 92.4 | 79.8 |
| 30-35 | 130 | 500 | 15 | 28 | 45 | 120 | 236 | 93.3 | 80.9 |
| 30-35 | 130 | 500 | 15 | 28 | 60 | 60 | 367 | 95.1 | 83.6 |
| 30-35 | 110 | 500 | 15 | 28 | 60 | 60 | 352 | 90.9 | 81.5 |
| 30-35 | 130 | 1000 | 15 | 28 | 15 | 120 | 289 | 94.0 | 87.3 |
| 30-35 | 150 | 1000 | 15 | 28 | 10 | 120 | 356 | 94.4 | 85.4 |
| 75-80 | 150 | 1000 | 16.7 | 28 | 15 | 120 | 305 | 93.1 | 85.8 |
| 75-80 | 150 | 500 | 16.7 | 28 | 30 | 120 | 302 | 90.7 | 86.2 |
| 75-80 | 150 | 1000 | 16.7 | 28 | 60 | 60 | 347 | 95.9 | 86.8 |
| 75-80 | 150 | 500 | 16.7 | 28 | 60 | 60 | 338 | 94.3 | 85.2 |

Temperature in Step (b) is always at 150° C.
Pressure in Step (b) is always at 1000 kPa (g)
No acid is added in Step (a), all acid is added in Step (b)
pH in Step (a) is 6.5-7.0
pH in Step (b) is about 1.5
All leach tests done in saline process water

TABLE 3

| Feed Concentrate | |
|---|---|
| Ni % | 9.0 |
| Co % | 0.21 |
| Fe % | 10.3 |
| Mg % | 18.6 |
| S % | 8.5 |
| Pulp Density % | 33 |
| pH | 8.2 |
| Cl in Leach Solution, g/L | 28 |
| Feed Mineralogy | |
| Pentlandite % | 13.5 |
| Millerite % | 5.5 |
| Violarite % | 1.5 |
| Pyrite % | 2.8 |
| Magnetite % | 6.0 |
| Magnesite % | 8.5 |
| Other Gangue % | 62.2 |
| Step 1 | |
| Temperature | 143 |
| Total Pressure, psig | 179 |
| Retention time, mins | 80 |
| pH | 7.4-6.4 |
| Eh, mV | 300-380 |
| Leach Solution | |
| Ni, mg/L | 2060 |
| Co, mg/L | 1 |
| Fe, mg/L | 3 |
| Mg, mg/L | 8250 |
| Solids | |
| Ni % | 8.6 |
| Co % | 0.22 |
| Fe % | 10.6 |
| Mg % | 17.9 |
| S % | 7.9 |

TABLE 3-continued

| Step 2 | |
|---|---|
| Temperature | 150 |
| Total Pressure, psig | 210 |
| Retention time, mins | 120 |
| pH | 1.65 |
| Eh, mV | 635 |
| Leach Solution | |
| Ni, mg/L | 44700 |
| Co, mg/L | 1040 |
| Fe, mg/L | 580 |
| Mg, mg/L | 44800 |
| Leach Residue | |
| Ni % | 0.65 |
| Co % | 0.03 |
| Fe % | 15.4 |
| Mg % | 14.1 |
| S % | 3.15 |
| S elem % | 1.60 |
| S sulphate % | 1.01 |
| Extraction | |
| Ni % | 95.5 |
| Co % | 90.1 |
| Fe % | 15.8 |
| Mg % | 53.4 |

TABLE 4

| Feed Concentrate | |
|---|---|
| Ni % | 12.2 |
| Co % | 0.32 |
| Fe % | 9.2 |
| Mg % | 17.7 |
| S % | 7.6 |

TABLE 4-continued

| | | |
|---|---|---|
| Pulp Density % | | 30 |
| pH | | 7.5 |
| Cl in Leach Solution, g/L | | 28 |
| Feed Mineralogy | | |
| Pentlandite % | | 9.0 |
| Millerite % | | 12.0 |
| Violarite % | | 1.0 |
| Pyrite % | | 0.5 |
| Magnetite % | | 6.4 |
| Magnesite % | | 6.8 |
| Other Gangue % | | 64.3 |
| | Step 1 | |
| Temperature | | 150 |
| Total Pressure, psig | | 183 |
| Retention time, mins | | 80 |
| pH | | 6.7-6.2 |
| Eh, mV | | 314-243 |
| Leach Solution | | |
| Ni, mg/L | | 11100 |
| Co, mg/L | | 17 |
| Fe, mg/L | | 3 |
| Mg, mg/L | | 9470 |
| Solids | | |
| Ni % | | 10.5 |
| Co % | | 0.33 |
| Fe % | | 9.5 |
| Mg % | | 17.1 |
| S % | | 6.0 |
| | Step 2 | |
| Temperature | | 150 |
| Total Pressure, psig | | 210 |
| Retention time, mins | | 120 |
| pH | | 1.35 |
| Eh, mV | | 660 |
| Leach Solution | | |
| Ni, mg/L | | 52200 |
| Co, mg/L | | 1420 |
| Fe, mg/L | | 519 |
| Mg, mg/L | | 41100 |
| Leach Residue | | |
| Ni % | | 0.62 |
| Co % | | 0.03 |
| Fe % | | 13.8 |
| Mg % | | 14.5 |
| S % | | 2.04 |
| S elem % | | 1.29 |
| S sulphate % | | 0.41 |
| Extraction | | |
| Ni % | | 96.3 |
| Co % | | 94.1 |
| Fe % | | 11.4 |
| Mg % | | 49.6 |

The invention claimed is:

1. A process for recovering nickel from a solid feed material containing nickel in the form of millerite which includes the steps of:
   (a) treating a slurry of the solid feed material and a process solution under non-acidic conditions so that all or at least part of the nickel in the millerite forms an acid leachable solid form;
   (b) pressure acid leaching the treated slurry from step (a) and leaching nickel in solids in the slurry into solution; and
   (c) recovering nickel from solution.

2. The process defined in claim 1 wherein the process solution contains at least 5 g/l chlorides.

3. The process defined in claim 1 wherein the process solution contains at least 20 g/l chlorides.

4. The process defined in claim 1 wherein step (a) includes treating the slurry of the feed material and the process solution at a pH in the range of 5.5-7.

5. The process defined in claim 4 wherein step (a) includes adjusting the pH of the slurry to be within the range of 5.5-7 and maintaining the pH within the range during step (a) by the presence of acid soluble alkaline gangue minerals in the feed material or by adding an alkaline agent to the slurry.

6. The process defined in claim 1 wherein step (a) includes treating the slurry of the feed material and the process solution at an elevated temperature.

7. The process defined in claim 6 wherein the elevated temperature is in a range of 80-160° C.

8. The process defined in claim 6 wherein the elevated temperature is at least 110° C.

9. The process defined in claim 6 wherein the elevated temperature is no more than 155° C.

10. The process defined in claim 6 wherein the elevated temperature is no more than 150° C.

11. The process defined in claim 1 wherein step (a) includes treating the slurry of the feed material and the process solution under oxidation conditions.

12. The process defined in claim 1 wherein step (a) includes treating the slurry of the feed material and the process solution under pressure oxidation conditions.

13. The process defined in claim 1 wherein step (a) includes treating the slurry of the feed material and the process solution under pressure oxidation conditions with an $O_2$ partial pressure that is sufficient to oxidize at least substantially all of the sulphide in the millerite to sulphate.

14. The process defined in claim 13 wherein step (a) also includes treating the slurry of the feed material and the process solution under pressure oxidation conditions with an $O_2$ partial pressure that is sufficient to oxidize other sulphide minerals in the feed material that can be oxidized without causing undesirable acid generation.

15. The process defined in claim 1 wherein step (a) includes treating the slurry of the feed material and the process solution under pressure oxidation conditions with an $O_2$ partial pressure in a range of 250-1000 kPa(g).

16. The process defined in claim 15 wherein the $O_2$ partial pressure is in a range of 500-1000 kPa(g) in step (a).

17. The process defined in claim 1 wherein the duration of step (a) is in a range of 15-90 minutes.

18. The process defined in claim 1 wherein step (b) includes acid leaching the treated slurry from step (a) at a pH of 3 or less.

19. The process defined in claim 1 wherein step (b) includes pressure acid leaching the treated slurry from step (a) at a pH of 2 or less.

20. The process defined in claim 1 wherein step (b) includes pressure acid leaching the treated slurry from step (a) in sulphuric acid.

21. The process defined in claim 1 wherein step (b) includes pressure acid leaching the treated slurry from step (a) under oxidation conditions.

22. The process defined in claim 1 wherein step (b) includes pressure acid leaching the treated slurry from step (a) under pressure oxidation conditions with an $O_2$ partial pressure in a range of 800-1200 kPa(g).

23. The process defined in claim 1 wherein step (b) includes pressure acid leaching the treated slurry from step (a) at an elevated temperature.

24. The process defined in claim 23 wherein the elevated temperature is in a range of 100-160° C.

25. The process defined in claim 23 wherein the elevated temperature is at least 130° C.

26. The process defined in claim 23 wherein the elevated temperature is no more than 155° C.

27. The process defined in claim 23 wherein the elevated temperature is no more than 150° C.

28. The process defined in claim 1 wherein the duration of step (b) is in a range of 30-120 minutes.

29. The process defined in claim 1 includes adding a separate slurry of a solid feed material and a process solution to the treated slurry from step (a) prior to or as part of step (b).

* * * * *